United States Patent
Hu et al.

(10) Patent No.: US 10,549,237 B2
(45) Date of Patent: Feb. 4, 2020

(54) REGENERABLE DRAW SOLUTE FOR OSMOTICALLY DRIVEN PROCESSES

(71) Applicant: NANYANG TECHNOLOGICAL UNIVERSITY, Singapore (SG)

(72) Inventors: Xiao Hu, Singapore (SG); Yufeng Cai, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 66 days.

(21) Appl. No.: 15/551,226

(22) PCT Filed: Feb. 17, 2016

(86) PCT No.: PCT/SG2016/050083
§ 371 (c)(1),
(2) Date: Aug. 15, 2017

(87) PCT Pub. No.: WO2016/133464
PCT Pub. Date: Aug. 25, 2016

(65) Prior Publication Data
US 2018/0015414 A1    Jan. 18, 2018

(30) Foreign Application Priority Data
Feb. 17, 2015 (SG) ............................. 10201501244

(51) Int. Cl.
*B01D 61/00* (2006.01)
*C02F 1/44* (2006.01)
*B01D 9/00* (2006.01)
*B01D 61/02* (2006.01)
(Continued)

(52) U.S. Cl.
CPC .......... *B01D 61/005* (2013.01); *B01D 9/005* (2013.01); *B01D 61/025* (2013.01); *B01D 61/027* (2013.01); *B01D 61/58* (2013.01); *C02F 1/441* (2013.01); *C02F 1/442* (2013.01);
(Continued)

(58) Field of Classification Search
None
See application file for complete search history.

(56) References Cited

U.S. PATENT DOCUMENTS

2010/0155333 A1    6/2010    Husain et al. ................ 210/644
2010/0224561 A1    9/2010    Marcin ......................... 210/644

FOREIGN PATENT DOCUMENTS

JP          2012183492 A  *  9/2012  .......... B01D 61/002
WO     WO 2005/012185       2/2005
(Continued)

OTHER PUBLICATIONS

International Search Report and Written Opinion issued in Application No. PCT/SG2016/050083, dated Mar. 14, 2016.
(Continued)

*Primary Examiner* — Krishnan S Menon
(74) *Attorney, Agent, or Firm* — Norton Rose Fulbright US LLP (57) ABSTRACT

Disclosed herein is a use of an inorganic salt to form and regenerate a draw solute for forward osmosis, wherein the inorganic salt is selected from one or more of the group selected from sodium sulfate, calcium lactate, disodium phosphate, tetrasodium pyrophosphate, and hydrates thereof. Also disclosed herein is a method of forward osmosis using said inorganic salt.

11 Claims, 4 Drawing Sheets

(51) Int. Cl.
B01D 61/58 (2006.01)
C02F 103/08 (2006.01)
(52) U.S. Cl.
CPC ...... *C02F 1/445* (2013.01); *B01D 2009/0095* (2013.01); *C02F 2103/08* (2013.01); *C02F 2303/16* (2013.01)

(56) References Cited

FOREIGN PATENT DOCUMENTS

| WO | WO 2010/067065 | 6/2010 |
|---|---|---|
| WO | WO 2012/120912 | 9/2012 |

OTHER PUBLICATIONS

Achilli et al., "Selection of inorganic-based draw solutions for forward osmosis applications" *Journal of Membrane Science* 2010, 364, 233-241.
Aldous, "The world's forgotten crisis" *Nature* 2003, 422, p. 251.
Apelblat et al., "Solubilities ofL-aspartic, DL-aspartic, DL-glutamic, p-hydroxybenzoic,o-anisic,p-anisic, and itaconic acids in water from T=278 K to T=345 K" *Journal of Chemical Thermodynamics* 1997, 29, 1527-1533.
Bai et al., "Highly water soluble and recovered dextran coated Fe3O4 magnetic nanoparticles for brackish water desalination" *Separation and Purification Technology* 2011, 81, 392-399.
Brenner et al., "Liquid-liquid equilibria for saturated aqueous solutions of sodium sulfate+1-propanol, 2-propanol, or 2-methylpropan-2-ol" *Journal of Chemical and Engineering Data* 1992, 37, 419-422.
Cai et al., "CO2 switchable dual responsive polymers as draw solutes for forward osmosis desalination" *Chemical Communications* 2013, 49, 8377-8379.
Cai et al., "Energy-efficient desalination by forward osmosis using responsive ionic liquid draw solutes" *Environmental Science: Water Research & Technology* 2015, 1, 341-347.
Cath et al., "Forward osmosis: Principles, applications, and recent developments" *Journal of Membrane Science* 2006, 281, 70-87.
Coday et al., "Effects of transmembrane hydraulic pressure on performance of forward osmosis membranes" *Environ Sci Technol* 2013, 47, 2386-2393.
Coday et al., "The sweet spot of forward osmosis: Treatment of produced water, drilling wastewater, and other complex and difficult liquid streams" *Desalination* 2014, 333, 23-35.
Elimelech et al., "The future of seawater desalination: energy, technology, and the environment" *Science* 2011, 333, 712-717.
Ge et al., "Exploration of polyelectrolytes as draw solutes in forward osmosis processes" *Water Res.* 2012, 46, 1318-1326.
Ge et al., "Hydroacid complexes: a new class of draw solutes to promote forward osmosis (FO) processes" *Chemical Communications* 2013, 49, 8471-8473.
Guo et al., "Na(+)-functionalized carbon quantum dots: a new draw solute in forward osmosis for seawater desalination" *Chemical Communications* 2014, 50, 7318-7321.
Kim et al., "A feasibility study of magnetic separation of magnetic nanoparticle for forward osmosis" *Water Science & Technology* 2011, 64, 469.
Kubantseva et al., "Solubility of Calcium Lactate in Aqueous Solution" *Food Reviews International* 2002, 18, 135-149.
Lu et al., "Bidirectional diffusion of ammonium and sodium cations in forward osmosis: role of membrane active layer surface chemistry and charge" *Environ Sci Technol* 2014, 48, 14369-14376.
Luo et al., "A review on the recovery methods of draw solutes in forward osmosis" *Journal of Water Process Engineering* 2014, 4, 212-223.
Lutchmiah et al., "Zwitterions as alternative draw solutions in forward osmosis for application in wastewater reclamation" *Journal of Membrane Science* 2014, 460, 82-90.
Lynn et al., "Recovery of anhydrous Na2SO4 from SO2-scrubbing liquor by extractive crystallization: Liquid-liquid equilibria for aqueous solutions of sodium carbonate, sulfate, and/or sulfite plus acetone, 2-propanol, or tert-butyl alcohol" *Industrial & engineering chemistry research* 1996, 35, 4236-4245.
McCutcheon et al., "A novel ammonia-carbon dioxide forward (direct) osmosis desalination process" *Desalination* 2005, 174, 1-11.
McCutcheon et al., "Desalination by ammonia-carbon dioxide forward osmosis: Influence of draw and feed solution concentrations on process performance" *Journal of Membrane Science* 2006, 278, 114-123.
McGinnis et al., "Energy requirements of ammonia-carbon dioxide forward osmosis desalination" *Desalination* 2007, 207, 370-382.
McGovern et al., "On the potential of forward osmosis to energetically outperform reverse osmosis desalination" *Journal of Membrane Science* 2014, 469, 245-250.
Mi et al., "Organic fouling of forward osmosis membranes: fouling reversibility and cleaning without chemical reagents" *Journal of Membrane Science* 2010, 348, 337-345.
Mok et al., "Circulatory osmotic desalination driven by a mild temperature gradient based on lower critical solution temperature (LCST) phase transition materials" *Phys Chem Chem Phys* 2013, 15, 19510-19517.
Noh et al., "Novel lower critical solution temperature phase transition materials effectively control osmosis by mild temperature changes" *Chemical Communications* 2012, 48, 3845-3847.
Panson et al., "Sodium Phosphate Solubility and Phase Relations Basis for Invariant Point Chemistry Control" *Journal of The Electrochemical Society* 1975, 122, 915-918.
Shaffer et al., "Desalination and reuse of high-salinity shale gas produced water: drivers, technologies, and future directions" *Environ Sci Technol.* 2013, 47, 9569-9583.
Shaffer et al., "Forward osmosis: Where are we now?" *Desalination* 2014, 356, 271-284.
Stone et al., "An initial study of hexavalent phosphazene salts as draw solutes in forward osmosis" *Desalination* 2013, 312, 130-136.
Stone et al., "Switchable polarity solvents as draw solutes for forward osmosis" *Desalination* 2013, 312, 124-129.
Ting et al., "Liquid-liquid equilibria for aqueous systems containing N, N-diethylmethylamine and sodium chloride or sodium sulfate" *Journal of Chemical and Engineering Data* 1992, 37, 252-259.

\* cited by examiner

REGENERABLE DRAW SOLUTE FOR OSMOTICALLY DRIVEN PROCESSES

CROSS REFERENCE TO RELATED APPLICATIONS

This application is a national phase application under 35 U.S.C. § 371 of International Application No. PCT/SG2016/050083 filed Feb. 17, 2016, which claims priority to Singapore Application No. 10201501244Q filed Feb. 17, 2015. The entire contents of each of the above-referenced disclosures is specifically incorporated by reference herein without disclaimer.

FIELD OF INVENTION

This invention relates to draw solutes for forward osmosis and a method of using the same.

BACKGROUND

The listing or discussion of an apparently prior-published document in this specification should not necessarily be taken as an acknowledgement that the document is part of the state of the art or is common general knowledge.

Desalination technologies are gaining in popularity nowadays, as fresh water scarcity has been widely recognized as a global crisis [1]. Amongst the mature and developed desalination technologies, electro-dialysis (ED) is most suitable to treat feed streams with a concentration much lower than seawater [2]. While reverse osmosis (RO) is believed to be a mature technology for seawater desalination, as it operates towards a theoretical optimum concerning energy consumption [3], it cannot be used to desalinate feed streams with high salinities, such as seawater RO brine and certain waste waters produced by the oil and gas industry [4]. This is because of the high hydraulic pressure requirement of such feed streams. Thermal distillation technologies including multi-stage flash (MSF), multi-effect distillation (MED), vapor compression (VC) or membrane distillation (MD) consume a large amount of energy, though they can be used to desalinate brines. Therefore, it is desirable to develop alternative desalination technologies that can efficiently treat highly concentrated brines.

Forward osmosis (FO) has shown promise [5] in this regard. The permeation of water through a membrane is an automatic process driven by the osmotic pressure difference, or rather chemical potential gradient. In addition, the fouling in FO is significantly less and much easier to clean than RO because FO operates at much lower hydraulic pressures [6]. However, the product of an FO process alone is a diluted draw solution, which actually has a higher osmotic pressure than the feed solution. Therefore, the success of FO as a viable desalination technology calls for the discovery and development of more suitable draw solutes that can be regenerated efficiently and cost effectively. Although many inorganic salts [7] and organic compounds [5] have been studied as draw solutes that show a sufficiently high drawing ability against a feed with salinity equal to or even higher than seawater, their regeneration actually consumes more electrical energy than RO [8]. The entire process is therefore not economically viable. In fact, all non-responsive or non-regenerable draw solutes, including polyelectrolytes, zwitterionic compounds, quantum dots, organic salts and hydroacid complexes [9-13] face the same formidable challenge discussed above. Therefore, exploring 'smart' and regenerable draw solutes that can substantially reduce the osmotic pressure of the diluted draw solute after FO process via a certain stimulus or reaction have recently become a focused study topic concerning FO technology. Magnetic nanoparticles [14] and inorganic salts ($CuSO_4$ or $MgSO_4$) that can be recovered by metathesis [15] have been investigated. The problems for magnetic nanoparticles are insufficient osmotic pressure and severe agglomeration [16], while metathesis regeneration of $CuSO_4$ or $MgSO_4$ is tedious and requires the use of large amounts of chemicals.

Another group of smart draw solutes are molecules including macromolecules with lower critical solution temperature (LCST). At temperatures lower than the LCST, draw solutes dissolve in water to make a homogeneous draw solution; while at temperatures higher than the LCST, the hydrophobic interaction between draw solutes dominates to engender phase separation. Modified polyethylenimine [17], ethylene glycol ethers [18] and thermally responsive ionic liquids [19] have been proven to be capable of seawater desalination at a bench scale. It is worth noting that these LCST-type regenerable draw solutes stem from a subtle balance between hydrophilicity and hydrophobicity. While higher hydrophobicity leads to lower LCST (e.g.,<60° C.) which favors the ease of draw solute recovery, higher hydrophilicity is desired to generate a higher drawing ability.

$CO_2$ responsive organic amine compounds [20] and dual responsive polymers reported recently are also promising draw solutes. These compounds/polymers become charged electrolytes or polyelectrolytes after protonation by $CO_2$ and produce a high osmotic pressure in FO processes. Advantageously, the compounds/polymers revert back to uncharged natural or thermally responsive states via removal of $CO_2$ to facilitate the regeneration process. The use of dual responsive polymers as draw solutes [21] further reduced the draw solute back diffusion and mitigated the issue of membrane damage by draw solutes based on low molecular organic amines.

Another effective thermolytically regenerable draw solute is based on ammonia-carbon dioxide system [22-24]. Thermolytic salts including ammonium bicarbonate, ammonium carbonate and ammonium carbamate are highly soluble, can generate very high osmotic pressures and can thermally decompose into $CO_2$ and $NH_3$ gases, which are then recombined to form the original draw solutes in the regeneration process.

Although the thermally regenerable draw solutes (thermolytic and LCST-type) discussed above may not enable FO to consume less energy than RO, they can lower the energy cost by using cheaper low grade thermal energy instead of electrical energy in the regeneration process [25]. For example, using a thermally responsive ionic liquid as draw solute [19], the theoretical electrical energy consumption for seawater desalination is only a fraction (16%) of that for RO. Low grade thermal energy can be used to make up the rest of the energy required for the separation, leading to potentially significant saving of energy cost and reduction of carbon footprint.

SUMMARY OF INVENTION

In a first aspect of the invention, there is provided a use of an inorganic salt to form and regenerate a draw solute for forward osmosis, wherein the inorganic salt is selected from one or more of the group selected from sodium sulfate, or, more particularly, calcium lactate, disodium phosphate, tetrasodium pyrophosphate, and hydrates thereof.

In embodiments of the first aspect of the invention
(a) the inorganic salt may be disodium phosphate or hydrates thereof (e.g. wherein the inorganic salt is disodium phosphate dodecahydrate); and/or
(b) the inorganic salt may be provided as a solution in water having a concentration of from 10 wt % to 50 wt % (e.g. from 35 wt % to 45 wt %, such as 40 wt %).

In a second aspect of the invention, there is provided a method of forward osmosis comprising:
(a) introducing a first solution having a first temperature on a first side of a semi-permeable membrane and a concentrated draw solution comprising an inorganic salt having a second temperature on a second side of the semi-permeable membrane;
(b) promoting flow of at least a portion of the first solution across the semi-permeable membrane to form a second solution on the first side of the semi-permeable membrane and a dilute draw solution on the second side of the semi-permeable membrane;
(c) introducing at least a portion of the dilute draw solution to a first separation operation at a third temperature to recover a hydrate of the inorganic salt and a solution stream;
(d) heating the hydrate of the inorganic salt to a fourth temperature to regenerate the concentrated draw solution; and
(e) reintroducing the concentrated draw solution to the second side of the semi-permeable membrane, wherein:
the inorganic salt is selected from one or more of the group selected from sodium sulfate, or, more particularly, calcium lactate, disodium phosphate, tetrasodium pyrophosphate, and hydrates thereof; and
the first temperature and the second temperature are greater than the third temperature.

In embodiments of the second aspect of the invention:
(i) the inorganic salt may be disodium phosphate or hydrates thereof (e.g. the inorganic salt is disodium phosphate dodecahydrate);
(ii) the inorganic salt may be provided in the draw solution at a concentration of from 10 wt % to 50 wt % (e.g. from 35 wt % to 45 wt %, such as 40 wt %);
(iii) the first and second temperatures are independently from 32° C. to 55° C., and the third temperature may be from 0° C. to 30° C. (e.g. from 20° C. to 25° C.);
(iv) the fourth temperature may be from 40° C. to 55° C.;
(v) the first solution may be seawater, brackish water, brine, a municipal wastewater, a wastewater from the oil and gas industry or a wastewater from the mining industry.

In a yet further embodiment of the second aspect of the invention, when the solution stream comprises the inorganic salt, the solution stream is subjected to a further separation operation to provide a solvent stream and a hydrate of the inorganic salt. For example, the further separation operation may be:
(i) an isobaric RO/NF filtration process; and/or
(ii) an organic solvent-assisted extractive crystallisation to provide the hydrate of the inorganic salt and solvent mixture that is yet further separated to provide an organic solvent and the solvent stream (e.g. the organic solvent may be added to the solution stream at a weight % ratio of from 20 wt % to 150 wt % relative to the solvent stream, such as from 60 wt % to 120 wt %; and/or the organic solvent may be selected from one or more of the group consisting of a ketone, an ester, an ether, a nitrile, and an alcohol (e.g. the organic solvent is acetone)).

DRAWINGS

FIG. 4. is a schematic illustration of brine treatment via FO using $Na_2HPO_4$ as draw solute which can draw water from very high salinity, e.g., 17 wt % NaCl solution which is difficult to be treated directly using RO process. Diluted draw solution, e.g., 20 wt % $Na_2HPO_4$ is first cooled to a lower temperature where the majority of the draw solute is regenerated by precipitation/crystallization into $Na_2HPO_4.12H_2O$, which turns into a 40 wt % $Na_2HPO_4$ solution simply upon mild heating to be reused directly without further dilution or concentration. The remaining draw solute in the crystallization supernatant, containing much less $Na_2HPO_4$, e.g., 10.5wt % and 4.2wt % at 25 and 10° C. respectively, can be regenerated by a solvent assisted extractive crystallization or simply by an isobaric RO or NF filtration process. The precipitated $Na_2HPO_4$ crystal is again in dodecahydrate form $Na_2HPO_4.12H_2O$ and can be reused directly.

DESCRIPTION

This invention provides one or more regenerable draw solutes that do not necessarily have to rely on the physical phenomenon of LCST with retrograde temperature dependent solubility. Highly soluble salts and small molecules, either organic or inorganic, were investigated to see if they might have a desirable profile of temperature dependency of solubility, as a sufficiently large solubility difference at different temperatures may present the possibility of developing a new draw solute for forward osmosis.

A list of possible candidate substances were identified and their properties are summarized in Table 1 (sodium chloride with virtually no solubility dependency on temperature was used as reference. The data marked with asterisks in Table 1 are solubility data at 298 K). All of the substances identified have high solubility at moderately high temperatures, e.g., 333 K (60° C.), but substantially lower solubility at lower temperatures, e.g., 298 K (25° C.) or 293 K (20° C.).

TABLE 1

| Compound | Solubility (mol/kg) 293K | Solubility (mol/kg) 333K | Solubility Ratio (Solubility@ 333K/ Solubility@ 293K) | Reference |
|---|---|---|---|---|
| Itaconic acid | 0.75* | 3.66 | 4.88 | [26] |
| 3-Aminophenol | 0.23 | 1.59 | 6.91 | [27] |
| Ammonium oxalate | 0.36 | 1.12 | 3.11 | [28] |
| Sodium tetraborate | 0.13 | 0.87 | 6.69 | [28] |
| Potassium bromate | 0.41 | 1.33 | 3.24 | [28] |
| Cesium nitrate | 1.17 | 4.32 | 3.69 | [28] |
| Potassium nitrate | 3.79* | 10.81 | 2.85 | [28] |
| Calcium lactate | 0.19 | 1.00 | 5.26 | [28] |
| Disodium phosphate | 0.57 | 5.81 | 10.19 | [28] |
| Tetrasodium pyrophosphate | 0.19 | 0.94 | 4.95 | [28] |
| Sodium chloride | 6.13 | 6.33 | 1.03 | [28] |

Following further consideration, substances in Table 1 that were either caustic or toxic were eliminated, leaving calcium lactate, disodium phosphate and tetrasodium pyrophosphate for further investigation. All three have shown promise, although disodium phosphate stands out, not only because of its highly sensitive solubility on temperature, but also its low toxicity (in fact, disodium phosphate is a commonly used food additive) amongst other unique attributes as a regenerable draw solute. Given these attributes, disodium phosphate may be used for a wide range of applications in different industrial sectors. For example, disodium phosphate may be used in desalination (e.g. sea water, brackish water, brine), in the treatment of municipal waste water and in treating waste water from the oil & gas and mining industries. The non-toxic nature of disodium phosphate also allows it to be used in the food industry. Regenerable draw solutes having high osmotic pressures may also find applications in other osmotic driven processes such as pressure retarded osmosis and FO-RO hybrid processes.

Thus, this invention relates to the use of an inorganic salt to form and regenerate a draw solute for forward osmosis, wherein the inorganic salt is selected from one or more of the group selected from sodium sulfate, or, more particularly, calcium lactate, disodium phosphate, tetrasodium pyrophosphate, and hydrates thereof. The use of the inorganic salt can be provided as a draw solute by the dissolution of the inorganic salt (or a hydrate form thereof) into water at a concentration of from 10 wt % to 50 wt % (e.g. from 35 wt % to 45 wt %, such as 40 wt %). The weight percentages used herein are based upon the weight of the anhydrous inorganic salt. In particular embodiments that may be mentioned herein, the inorganic salt may be disodium phosphate or hydrates thereof (e.g. the inorganic salt may be disodium phosphate dodecahydrate), wherein the concentration of the salt may be as mentioned hereinbefore.

The invention also relates to a method of forward osmosis comprising:
(a) introducing a first solution having a first temperature on a first side of a semi-permeable membrane and a concentrated draw solution comprising an inorganic salt having a second temperature on a second side of the semi-permeable membrane;
(b) promoting flow of at least a portion of the first solution across the semi-permeable membrane to form a second solution on the first side of the semi-permeable membrane and a dilute draw solution on the second side of the semi-permeable membrane;
(c) introducing at least a portion of the dilute draw solution to a first separation operation at a third temperature to recover a hydrate of the inorganic salt and a solution stream;
(d) heating the hydrate of the inorganic salt to a fourth temperature to regenerate the concentrated draw solution; and
(e) reintroducing the concentrated draw solution to the second side of the semi-permeable membrane, wherein:
the inorganic salt is selected from one or more of the group selected from sodium sulfate, calcium lactate, disodium phosphate, tetrasodium pyrophosphate, and hydrates thereof; and
the first temperature and the second temperature are greater than the third temperature.

In an example embodiment, the invention may relate to the use of disodium phosphate (or its hydrates) as a regenerable draw solute in forward osmosis desalination. It has been found that a 40 wt % (based on anhydrous $Na_2HPO_4$) draw solution can generate water flux from feed streams of high salinity up to 17 wt % NaCl, or around five times the salinity of seawater, which might be the highest reported among all regenerable draw solutes.

Unlike most regenerable draw solutes that are regenerated by heating, the majority of the new draw solutes described herein can be regenerated by cooling of the diluted draw solution to ambient temperature, e.g., 25, 20 or 10° C. For example, when the temperature of the diluted draw solution is reduced to 25° C. a phase-separation occurs, providing disodium phosphate dodecahydrate ($Na_2HPO_4.12H_2O$) solid crystals and a saturated supernatant solution containing 10.5 wt % of disodium phosphate. As shown hereinbelow, while the crystal form is independent of the crystallization temperature within the window of study, the concentration of the supernatant was found to be temperature dependent. For example, the concentration of supernatant can be further reduced to 7.5 and 4.2 wt % (based on the anhydrous form of the salt) if the diluted draw solution is instead cooled to 20° C. and 10° C., respectively. The precipitated crystals can be reused directly as a draw solution with exactly the same concentration of the original draw solution (40 wt %) after melting under mild heating (e.g. at a temperature above 32° C.) with no water and salt makeup. Thus, disodium phosphate dodecahydrate may be a particularly attractive form of disodium phosphate and its solvates for use in the current invention.

As noted hereinbefore, the supernatant still contains an amount of disodium phosphate, which can also be readily regenerated. For example, one method that can be used to achieve regeneration of the remaining disodium phosphate in the supernatant is via a simple filtration, e.g., isobaric NF or RO, where the remaining disodium phosphate can be readily removed due to the large size of dibasic phosphate anions. However, we also describe herein a solvent-aided crystallization, or extractive crystallization, method which is an interesting and highly effective method for the regeneration of a draw solute from the supernatant (e.g. disodium phosphate). While counter solvent extractive crystallization has long been used in salt production [30], its usage in draw solute regeneration has not been reported. The results obtained so far demonstrate that disodium phosphate serves well as a new and temperature sensitive draw solute even for high salinity brine treatment.

The solvent used for the solvent extractive crystallization may be any suitable organic solvent. The organic solvent may be used in an amount that leads to the crystallization of the inorganic salt used (e.g. disodium phosphate as its dodecahydrate). For example, the amount of organic solvent used may be from 20 wt % to 150 wt % relative to the solvent stream (e.g. from 60 wt % to 120 wt %). Organic solvents that may be mentioned herein include solvents selected from the group consisting of a ketone, an ester, an ether, a nitrile, an alcohol, and mixtures thereof. Ketones that may be mentioned herein include acetone. Esters that may be mentioned herein include ethyl acetate. Nitriles that may be mentioned herein include acetonitrile. Ethers that may be mentioned herein include diethyl ether, tetrahydrofuran, diglyme, 1,2-dimethoxyethane, 1,4-dioxane and methyl t-butyl ether. Alcohols that may be mentioned herein include a $C_{1-4}$ straight-chain or branched alcohol, ethylene glycol and glycerin. A particular solvent that may be mentioned herein is acetone. Acetone can be easily separated from water and, unlike other solvents such as ethanol (as such, it will be appreciated that non-azeotropic solvents may be preferred in embodiments of the invention), acetone has no azeotropic point with water during distillation. Acetone was also found to be highly effective in precipitating $Na_2HPO_4$ as seen from experimental data.

Figure 4:
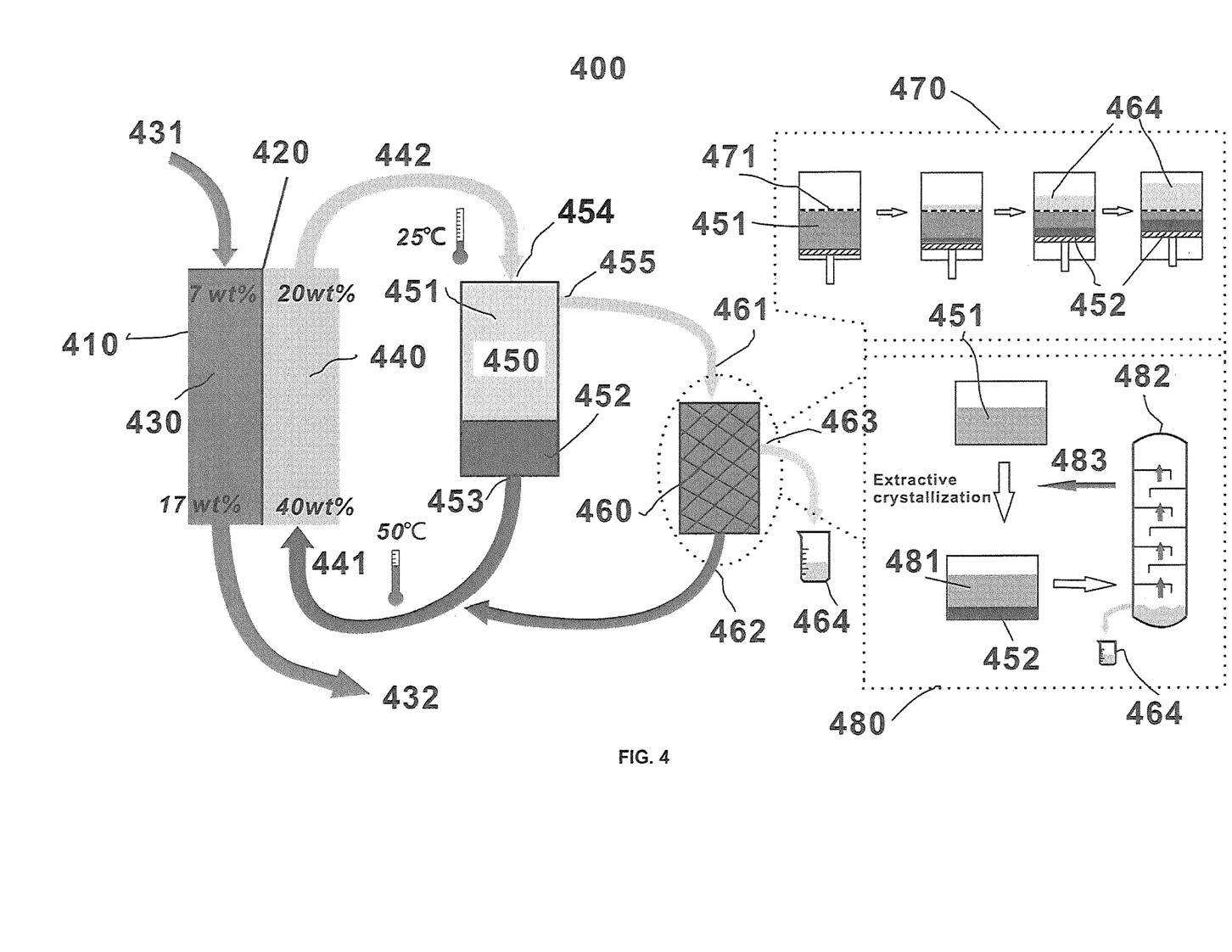

A FO process and the cooling induced precipitative regeneration described herein are schematically shown in FIG. 4. In FIG. 4, the system 400 comprises a forward osmosis module 410 having a forward osmosis membrane 420 that splits the module into two sections, a first section 430 for a feed solution and a second section 440 for a draw solution. The first section contains an inlet 431 to supply the feed solution and an outlet 432 for discharge or to a crystallizer. The second section contains an inlet 441 that is connected to a first recovery device 450 (the inlet 441 being connected to an outlet 453 of the first recovery device) and an outlet 442 that is also connected to the first recovery device (the outlet 442 being connected to an inlet 454 of the first recovery device). The first recovery device (or chamber) chamber in turn has a further outlet 455 that is connected to an inlet 461 of a second recovery device 460, which has an outlet 462 that is connected to the inlet 441 of the second section 440 and a further outlet 463 that provides treated water 464.

As depicted in FIG. 4, the feed solution is initially provided as a 7 wt % saline solution through inlet 431 at a temperature of from around 45° C. to around 50° C. (first temperature), while the draw solution is provided as a 40 wt % solution of $Na_2HPO_4$ through inlet 441 at 50° C. (second temperature). Once the 40 wt % draw solution is diluted in the FO process (e.g. to 20 wt % as depicted in FIG. 4), the diluted draw solution is provided to the first recovery chamber 450, where it undergoes cooling (e.g. to 25° C.; third temperature), resulting in precipitation of crystalline $Na_2HPO_4.12H_2O$ 452 and a supernatant phase 451 containing $Na_2HPO_4$ (e.g., 10.5wt % at 25° C.). The solid crystals 452 can be readily removed (e.g. through outlet 453) from the liquid supernatant 451 and re-melted into liquid form by heating to a temperature of from 45° C. to 50° C. (fourth temperature), thereby regenerating a 40 wt % solution of $Na_2HPO_4$ that can be reintroduced into the second section 440 through inlet 441. This recovers a significant proportion of the $Na_2HPO_4$, but there remains an amount of $Na_2HPO_4$ in the liquid supernatant 451. Even energy-intensively cooling to near-zero degrees would not precipitate all of the draw solute as $Na_2HPO_4.12H_2O$ from the liquid supernatant. Therefore, after cooling the draw solution, an ensuing regeneration process is needed for complete separation of draw solute from the supernatant solution.

FIG. 4 illustrates two possible methods for further regeneration of the residue draw solute remaining in the supernatant in the second regeneration device 460, as illustrated in boxes 470 and 480.

The first option as illustrated in box 470 of FIG. 4 is to directly apply nanofiltration (NF) or RO on the supernatant, by use of a membrane module comprising a reverse osmosis or nanofiltration membrane 471 to produce purified water 464 (which would exit the device by outlet 463, not shown) and a further batch of crystallized $Na_2HPO_4.12H_2O$ 452 that can also be recycled via outlet 462 to second section 440. Even though this is not the process chosen for detailed study herein, it is useful to discuss its advantages briefly. Based on the FO water flux test (see Example 3 below), the osmotic pressure of a 10.5 wt % supernatant is estimated to be not higher than that of 4.5 wt % NaCl, which is about 35 bar. Similarly a 7.5 wt % supernatant (cooling to 20° C.) was found to correspond to a 3.4 wt % NaCl solution with an osmotic pressure of about 26 bar. A seawater RO plant (hydraulic pressure from 27 bar to 60 bar) is capable of handling such supernatants. Thus, one distinct merit of the FO process using $Na_2HPO_4$ draw solute is the ability to enhance the water recovery in a seawater RO plant from typically 50% to up to 80% through the combination of FO with RO processes. In addition, this new draw solute can expand the capability of an RO plant to treat other brines with even higher salinity toward a near-zero liquid discharge process. Another underlying advantageous feature is that only an isobaric NF or RO process is needed in this case (FIG. 4) because as water permeates through the NF or RO membrane, the feed solution is not expected to become more concentrated due to accompanying precipitation of hydrated crystal from a supersaturated supernatant.

The second option illustrated in box 480 of FIG. 4 involves the solvent-assisted crystallization of the supernatant 451, which is illustrated as containing 10 wt % of $Na_2HPO_4$. This process involves adding an organic solvent (e.g. acetone) into the supernatant to form a solvent mixture 481 of water and the organic solvent and provides a further batch of $Na_2HPO_4.12H_2O$ that may be re-used as described hereinbefore. The solvent mixture 481 is provided to a distillation tower 482 to provide the organic solvent 483 and treated water 464 (removed through outlet 463).

In a parallel study, sodium sulfate $Na_2SO_4$ was also investigated as a possible draw solute due to its relatively large temperature dependency on solubility. Sodium sulfate also showed potential as a draw solute, although the recovery of $Na_2SO_4$ may be more difficult than $Na_2HPO_4$. However, membrane filtration (e.g., NF or RO) and/or extractive crystallization may still be used after temperature modulation.

As discussed herein, sodium sulfate, or, more particularly, calcium lactate, disodium phosphate, tetrasodium pyrophosphate, and their hydrates, particularly disodium phosphate and its hydrates, may be considered as a promising alternative regenerable draw solutes. It is also demonstrated herein that it is possible to regenerate the draw solute via crystallization processes first by cooling and then aided by a solvent. Although the process disclosed herein is still a membrane based process, the main energy consumed during the FO and draw solute regeneration is in the form of low grade heat energy, which is less expensive than electrical energy particularly if waste heat is available. This could be an advantage over RO. Compared with other thermally driven processes such as water distillation, e.g., MSF, MED and MD which are potentially capable for brine treatment, the process discussed here may involve instead a direct distillation of acetone which might be more advantageous over membrane distillation of water given the lower boiling point of 56° C., lower vaporization enthalpy of 539 J/g and lower 2.16 J/(g·K) specific heat of acetone. This is in contrast to the vaporization enthalpy and specific heat of water, which are 2260 J/g and 4.18 J/(g·K), respectively.

EXAMPLES

Materials and Equipment

Sodium chloride (>99.5%) was purchased from Merck. Anhydrous disodium phosphate (>98.5%) was purchased from Sigma-Aldrich. Analytical reagent grade acetone was purchased from Fisher Scientific UK. Deionized (DI) water with electric resistance>18 MΩ was used throughout the experiments. All chemicals were used as received. The thin film composite FO membrane was purchased from Hydration Technology Innovations and immersed in DI water for 24 hours before use. The membrane can tolerate a high temperature of 71° C. and a pH range of from 2-11, and its intrinsic parameters can be found elsewhere [31]. Rotary evaporator (Heidlph G3) was used to mimic the separation of acetone from water by evaporation. The distillation was conducted at 70° C. and 310 mbar for two hours. The melting of precipitated $Na_2HPO_4.12H_2O$ crystals is recorded by differential scanning calorimetry (DSC, TA instruments, Q10). The solid content, i.e., anhydrous $Na_2HPO_4$ in crystal hydrates was confirmed by thermal gravimetric analysis (TA Instruments, Q500). The trace acetone residue in the product water after distillation was determined by a total organic carbon (TOC) analyzer (Shimadzu, TOC-V CSH). Back diffusion in FO process were analyzed by ion chromatography (Dionex ICS-2100, Thermo Scientific).

Example 1

Determination of Disodium Phosphate Solubility

To measure the solubility at different temperatures, an excess amount of anhydrous disodium phosphate was mixed with 10 g of DI water in sealed vials under magnetic stirring at various temperatures controlled by a water bath. The temperature accuracy was within ±0.2° C. The solution and solid crystal mixture was isothermally stirred for 24 hours and stood still for 2 hours allowing for complete sedimentation. A fixed volume of the saturated supernatant was taken out using a pipette and weighed ($m_{sol}$) before dried in vacuum at 100° C. and 100 mbar until constant weight ($m_{dry}$) was reached. The solubility in weight percentage was calculated as $m_{dry}/m_{sol} \times 100\%$.

For a draw solute that has a positive correlation between solubility and temperature, it is desirable for it to produce high osmotic pressure by achieving its highest possible solubility at moderate temperatures that are not far above room temperature. In addition, its solubility at the ambient or room temperature should be as low as possible to facilitate draw solute recovery by precipitation.

Figure 1:
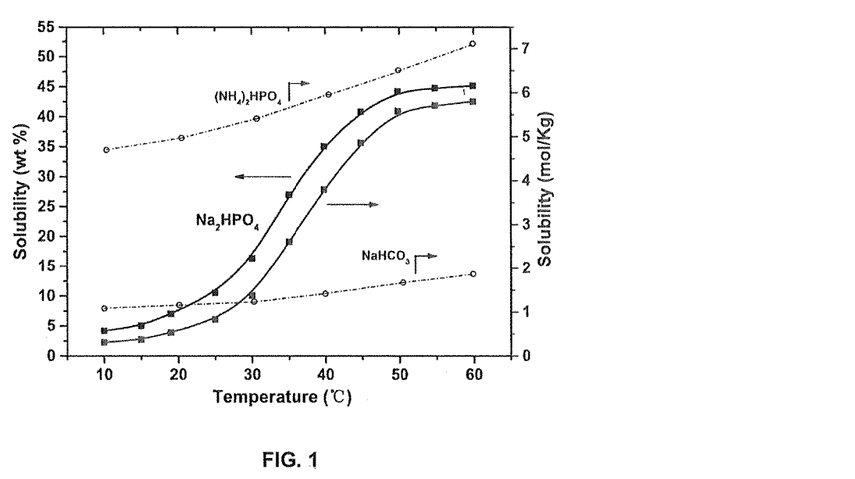
FIG. 1. depicts the solubility of $Na_2HPO_4$ in water at various temperatures. The solubility is given both in weight percentage of solution and molality (mole per kilogram of water) based on anhydrous $Na_2HPO_4$ solute. The solubility values of other inorganic salts that share a cation ($NaHCO_3$) and an anion (($NH_4)_2HPO_4$) with $Na_2HPO_4$ are also given in molality for comparison.

FIG. 1 shows the solubility of anhydrous disodium phosphate in water as a function of temperature. It can be seen that the solubility increased rapidly from 11.76 g/100 g at 25° C. to 82.36 g/100 g at 50° C., which indicates a 6.5 times solubility increase within a small temperature window of 25° C. The large change in solubility within such a small temperature range is quite rare for inorganic salts. For example, diammonium phosphate $(NH_4)_2HPO_4$ and sodium bicarbonate $NaHCO_3$, which respectively share an anion and a cation with disodium phosphate, have much less significant solubility dependency on temperature as shown in FIG. 1. Although the solubility of salts such as $(NH_4)_2HPO_4$ (and $KNO_3$ listed in Table 1) may be higher than that of disodium phosphate $Na_2HPO_4$ at elevated temperatures, e.g., 50° C., their relatively high solubility at lower temperature, e.g., 25° C. is undesirable. This means that after cooling to lower temperatures the diluted draw solution would still have high molality which may jeopardize the viability of their efficient regeneration [32]. However, the molality of saturated $Na_2HPO_4$ solution at room temperature is relatively low and is actually close to that of seawater. This probably indicates a similar osmotic pressure to seawater and enables viable draw solute recovery.

Interestingly for $Na_2HPO_4$, increasing the temperature above 50° C. does not significantly further increase its solubility which seems to plateau off at 45 wt %. Therefore, in order to achieve the highest available osmotic pressure of draw solution, the use of maximum 45 wt % $Na_2HPO_4$ solution as draw solution seems to be a natural choice. However, unlike many other salts that do not have any crystallization water in their crystals, disodium phosphate $Na_2HPO_4$ precipitates from an oversaturated solution in the form of dodecahydrate ($Na_2HPO_4.12H_2O$) when cooled below 35° C. [33]. The anhydrous salt concentration in the dodecahydrate is 40 wt % based on the formula calculation and also experimental measurement. This is intriguing because it indicates that the hydrate crystal might simply melt into a 40 wt % solution under heating and be re-used as draw solution. Therefore, the highest $Na_2HPO_4$ draw solution studied in this work was fixed at 40 wt % so that the regenerated draw solute in the form of $Na_2HPO_4.12H_2O$ can be directly reused without further treatment after melting.

Although exact osmotic pressure or osmolality of draw solution cannot be measured by freeze point depression method because of precipitation during testing owing to the extremely low solubility at sub-zero temperature, the maximum molality of draw solute at various temperatures can be easily calculated. According to FIG. 1, the 40 wt % draw solution has a corresponding molality of 4.7 mol/Kg. The drawing ability of this draw solution is experimentally measured from the water flux values during FO as discussed below in Example 3.

Example 2

Determination of Concentration in Water-Acetone-$Na_2HPO_4$ Ternary System

To determine the residue disodium phosphate concentrations in water/acetone mixture solution after the extractive crystallization of the supernatant obtained after cooling of the diluted draw solutions, various amounts of acetone, 20 wt % to 120 wt % with respect to the weight of pure water, was added into the supernatant (which is a 10 wt % $Na_2HPO_4$ solution at room temperature) in sealed vials. There is an instantaneous phase separation resulting in precipitation of solid crystal hydrates upon acetone addition. The mixture was allowed to settle for 1 hour before the solid crystals are removed. The solution portion was then extracted and weighed ($m_{sol}$) before dried vacuum oven at 100° C. and 100 mbar until constant weight ($m_{dry}$) was achieved. The $Na_2HPO_4$ concentration in water/acetone mixtures were then calculated accordingly. All the measurements were repeated for three times.

Figure 5:
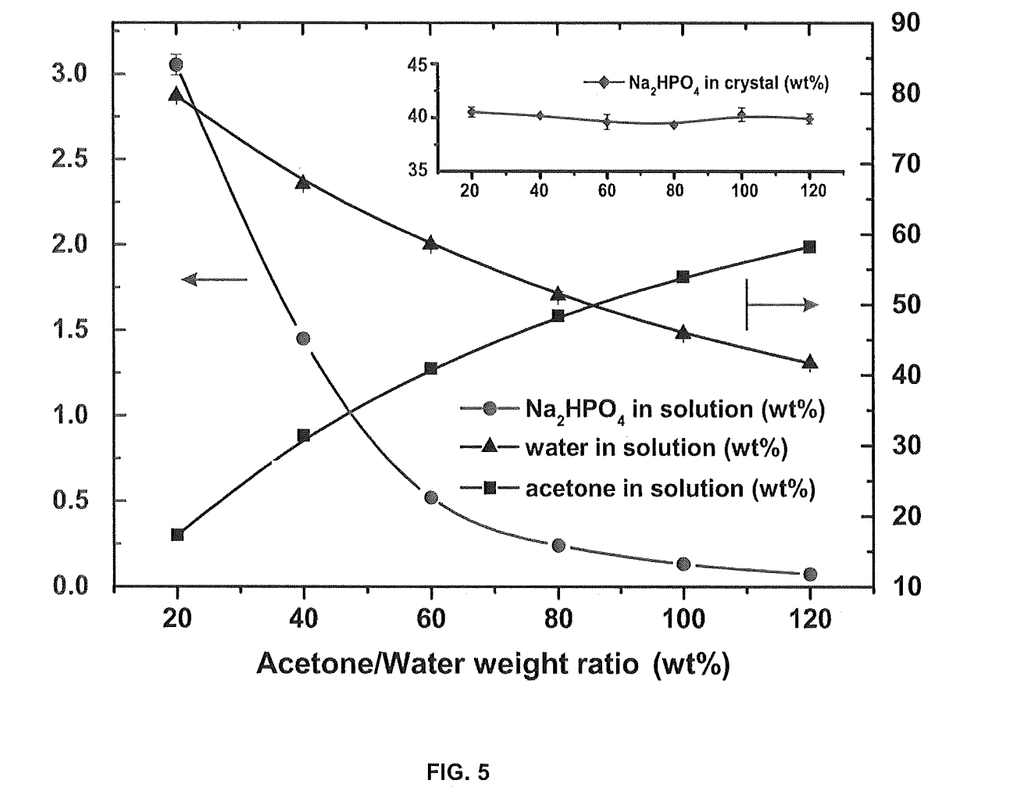
FIG. 5. The concentration profiles of $Na_2HPO_4$, water and acetone when different amounts of acetone is added to the effluent after the cooling of the diluted draw solution after FO (i.e., a 10 wt % $Na_2HPO_4$ aqueous solution). Inset is the $Na_2HPO_4$ concentration in the precipitated crystal during extractive crystallization.

Acetone was found to be highly effective in precipitating $Na_2HPO_4$ as seen from the experimental data presented in FIG. 5. FIG. 5 shows a very rapid decrease of $Na_2HPO_4$ concentration in the water/acetone mixture when an increasing amount of acetone was added into the mixture. For example, a 10 wt % $Na_2HPO_4$ supernatant was obtained when the diluted draw solution after FO was cooled to room temperature. The weight percentages of water and acetone are also measured and given in FIG. 5 for reference. Interestingly, the $Na_2HPO_4$ concentration in precipitated crystals was found experimentally to be stable around 40 wt % regardless of the amount of solvent added (see inset in FIG. 5). This confirms that the crystal precipitate is in the dodecahydrate crystal form and the presence of other compounds such as acetone did not compromise the purity of the hydrate crystal. This is in fact one of the highly desirable attributes of $Na_2HPO_4$ because it facilitates the regeneration and direct reuse of the draw solute.

In addition, as an example, we tested the efficiency of distillation of an acetone/water mixture with a weight ratio of 54:46 in a simple laboratory evaporator. The total organic content (TOC) in the product water can readily reach a level of 92 ppm. Although, this TOC concentration may have exceeded the limit for use as potable water, it may be adequate for some industrial applications. Furthermore, we believe that the TOC in the product water should be much lower when a more efficient fractional distillation module is used in a real plant. Eventually after this extractive crystallization and removal of acetone, i.e., via distillation, the residual $Na_2HPO_4$ draw solute in the product water can simply be pumped through an NF or RF polishing module at relatively low pressure (estimated at 1 bar) because the $Na_2HPO_4$ concentration can be as low as 0.28 wt % depending on the amount of solvent used during the extractive crystallization. This final step of treatment, when needed, can be readily integrated into the polishing step commonly established in an RO plant to attain higher purity.

Example 3

Water Flux and Draw Solute Back Diffusion Measurements

Water flux during FO was measured in a cross-flow setup by monitoring the feed solution weight decrease with time. The method is adapted from a reported standard procedure [31]. The initial weight of feed solution and draw solution was 500 g and 200 g, respectively. The effective membrane area was 58.5 cm$^2$. The feed and draw solutions flew in co-current in order to reduce the tension stress on membrane. The flow rate was 400 ml/min and plastic spacers were used in both feed and draw sides to reduce concentration polarization. During the tests, the temperature in draw solution and feed solution were monitored to be 50±1° C. and 46±2° C. respectively. The concentrations of feed solution and draw solution were kept virtually constant during the measurement. Water flux measurements were conducted in both FO mode (selective membrane layer facing towards feed solution) and PRO mode (selective layer facing towards draw solution). The water flux was calculated by:

$$Flux = \Delta m/(A*t) \quad (1)$$

Where $\Delta m$ is the value of feed solution weight decrease (kg), t is the corresponding measurement time (h) and A is the membrane area in square meters. Therefore, the flux is in unit of liter per square meter per hour (LMH) if the density of water is assumed to be 1 kg/L.

Draw solute back diffusion was monitored by measuring $[HPO_4^{2-}]$ in feed solution using ion chromatography after FO process for one hour. A control sample from the initial feed was also tested before FO. The feed concentration was kept constant by adding DI water during the FO test. The amount of $Na_2HPO_4$ reversely diffused into feed solution ($m_r$ in gram) is obtained by comparing the $[HPO_4^{2-}]$ concentration before and after FO. The reverse draw solute flux in gram per square meter per hour (gMH) is then determined by:

$$Flux_{draw} = m_r/(A*t) \quad (2)$$

where A is the effective membrane area (m$^2$) and t is the FO duration in hour.

Figure 2:
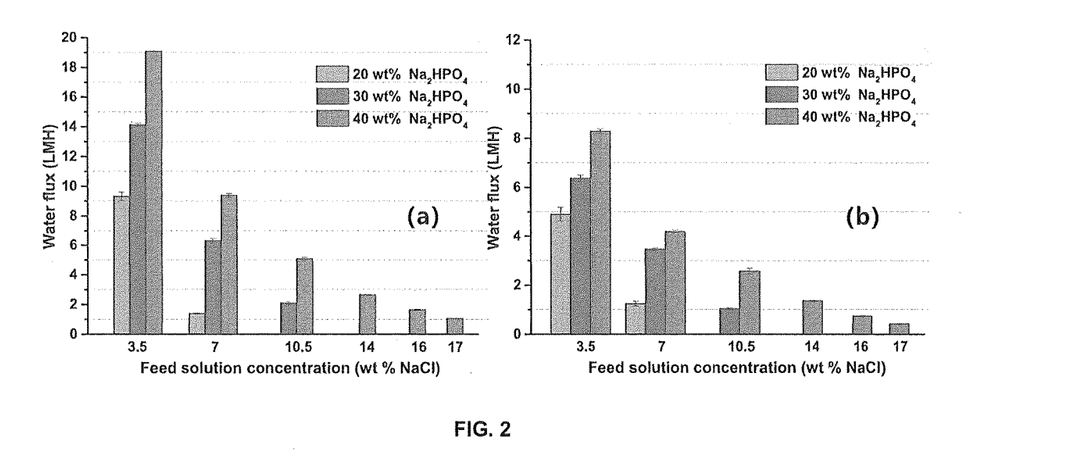
FIG. 2. depicts the water flux generated by $Na_2HPO_4$ draw solutions of different concentrations against feed solutions with different salinities in (a) PRO mode and (b) FO mode. Draw solution and feed solution were maintained at 50±1° C. and 46±2° C., respectively, during experiments.

FIG. 2 shows the water flux profile generated by $Na_2HPO_4$ draw solution against feed solution with various salinities. 40 wt % draw solution can generate a high water flux of 19 LMH and 8 LMH from artificial seawater (3.5 wt % NaCl) in PRO mode and FO mode, respectively. Note that these water flux values are comparable to that of commercial seawater RO plant of about 12 to 15 LMH. The relatively lower water flux in FO mode than PRO mode can be attributed to the severe diluted internal concentration polarization in FO mode [5], which is a common phenomenon for any FO process that utilizes current generation of asymmetric membranes. Although the water flux decreases with increasing feed solution salinity due to reduced osmotic pressure gradient across membrane, the water flux is still remain at about 1.0 LMH even when the feed solution salinity is increased to 17 wt % NaCl which has almost five times the salinity of seawater. The water fluxes in both PRO and FO mode are expected to improve if a better membrane is available which better mitigates the internal concentration polarization. Nevertheless, it is of particular note that 40 wt % $Na_2HPO_4$ draw solution can draw water at 1.0 LMH from a feed with such a high salinity. This means that FO desalination enabled by this new draw solute can potentially achieve 80% water recovery for seawater desalination at low pressure in a counter-current flow FO module, which is impractical for RO to achieve. In addition, other difficult feed streams, e.g., seawater RO brine and produced water from shale gas industry [4, 34], which are unable to be treated via RO, can now be treated via FO using this draw solution.

In fact, the new draw solution offers a possibility of concentrating brines to an osmolality equivalent to 17 wt % NaCl. Advantageously, this can result in the considerable reduction of liquid waste discharge and may even be helpful towards zero-liquid discharge.

The results generated herein also indicate that the $Na_2HPO_4$ draw solute has a very low back diffusion generally less than 1 gMH, e.g., 0.86 gMH for a 30 wt % draw solution. It is believed that this can be further reduced if a better membrane becomes available. The back diffusion value of $Na_2HPO_4$ is low compared to data reported for other inorganic (especially monovalent) salts [7] (typically 9 gMH for 5 wt % NaCl) and even better than that reported for zwitterions such as glycine betaine (2 gMH) of similar molecular weight to $Na_2HPO_4$ [10] and is comparable to the data reported for ionic liquid draw solutes (~0.5 gMH) [19].

Without wishing to be bound by theory, such a low level of back diffusion may be attributable to the divalent anion $HPO_4^{2-}$, as the relatively large size of $HPO_4^{2-}$ may prevent back diffusion. Also, the electrostatic repulsion between the $HPO_4^{2-}$ anion and the membrane may also play a role as the FO membrane used in this example is known to have a negative zeta potential [31]. In addition, the type of cation in the draw solute may also be important as it has been reported that cations often show higher flux than that of anion due to the attraction from negatively charged membranes and the bidirectional cation exchange between draw solution and feed solution is inevitable and notable [35]. Therefore, if the cation of a draw solution is different from $Na^+$ (for example $NH_4^+$), unwanted loss of draw solute may occur by loss of the cation via ion exchange due to concentration gradient across the membrane. Using the same cation in the draw solution as that in the feed ($Na^+$) instead of a different cation (e.g. ammonium), may eliminate any potential problem related to such cation exchange.

Figure 3:
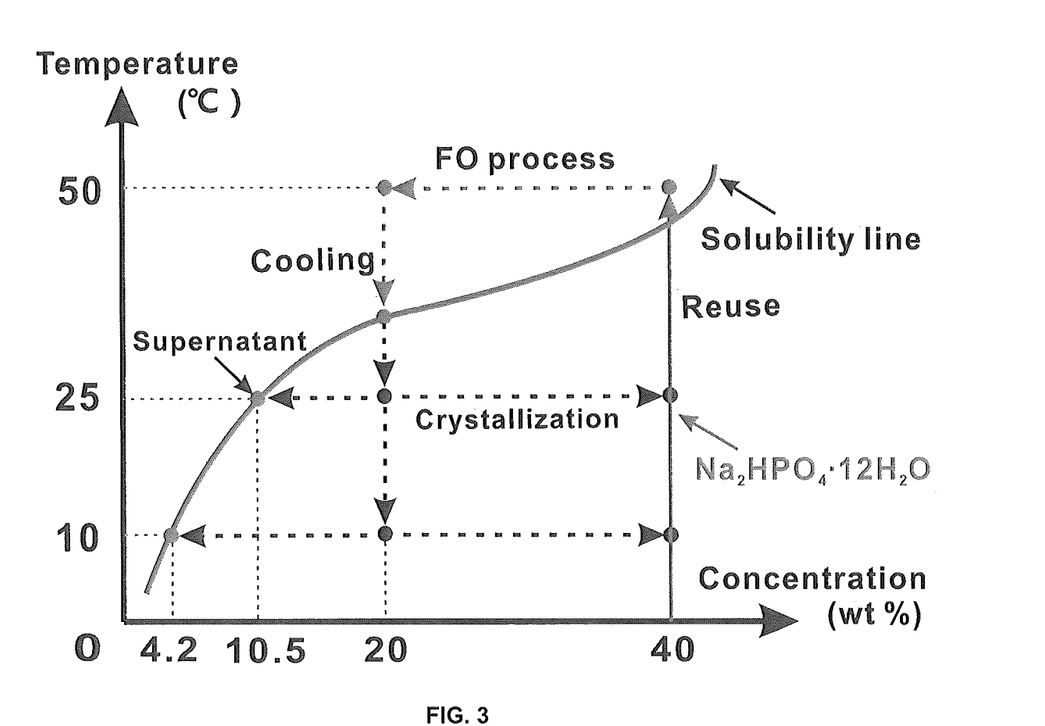
FIG. 3. depicts a phase diagram of $Na_2HPO_4$ illustrating the draw solute circulation in FO-crystallization processes at various temperatures. The draw solution phase separates into a saturated supernatant and a crystal phase. The composition of crystal phase is fixed to be dodecahydrate and is independent of crystallization temperature, while the concentration of supernatant decreases with reduced temperature. The weight ratio of each phase can be determined by lever rules.

FIG. 3 shows a phase diagram of $Na_2HPO_4$ obtained from solubility measurement based upon the procedure described above. During a FO process conducted at 50° C., the initial draw solution of 40 wt % is diluted as it draws fresh water from the feed stream across the membrane. It is not unusual to conduct FO above room temperatures [12, 22]. The diluted draw solution is then cooled from 50° C. to a crystallization temperature, e.g., 25, 20 or 10° C., in order to recover the draw solute. As shown in the $Na_2HPO_4$ phase diagram of FIG. 3, a diluted draw solution (e.g. 20 wt %) phase separates into a saturated supernatant phase and a $Na_2HPO_4.12H_2O$ hydrate crystal phase upon cooling.

It is particularly interesting and desirable that the form of the hydrate crystal phase is independent to the temperature and is always $Na_2HPO_4.12H_2O$. This is because these solid crystals can be readily removed from the liquid supernatant and re-melted into a liquid form at 32° C., and the inorganic components actually 'self-dissolves' into the released crystallization water to form an exactly 40 wt % solution at 45° C. (based on anhydrous $Na_2HPO_4$) ready to be pumped back for direct reuse as draw solution. This provides a potential first step draw solute recovery that regenerates the majority of the draw solute for direct reuse. The second step is to recover the still remaining draw solute in the liquid supernatant (e.g. by solvent-assisted crystallization or other means).

The concentration of $Na_2HPO_4$ in the supernatant on the other hand depends on the crystallization temperature. Supernatants of 10.5, 7.5 and 4.2 wt % were obtained when the diluted draw solution was cooled to 25, 20 and 10° C., respectively, which can be further treated. The weight ratio of each phase can be determined by a lever principle. For example, when the crystallization temperature is room temperature, the weight ratio of supernatant to crystal should be around 2:1 since the saturated supernatant's concentration is around 10.5 wt %. However, if the temperature is further reduced to 10° C., the weight ratio is about 4:3 since more salt in the supernatant is precipitated into crystals.

REFERENCES

[1] P. Aldhous, The world's forgotten crisis, Nature, 422 (2003) 251-251.

[2] Y. Ghalavand, M. S. Hatamipour, A. Rahimi, A review on energy consumption of desalination processes, Desalination and Water Treatment, (2014) 1-16.

[3] M. Elimelech, W. A. Phillip, The future of seawater desalination: energy, technology, and the environment, Science, 333 (2011) 712-717.

[4] D. L. Shaffer, L. H. Arias Chavez, M. Ben-Sasson, S. Romero-Vargas Castrillon, N. Y. Yip, M. Elimelech, Desalination and reuse of high-salinity shale gas produced water: drivers, technologies, and future directions, Environ Sci Technol, 47 (2013) 9569-9583.

[5] T. Cath, A. Childress, M. Elimelech, Forward osmosis: Principles, applications, and recent developments, Journal of Membrane Science, 281 (2006) 70-87.

[6] B. Mi, M. Elimelech, Organic fouling of forward osmosis membranes: fouling reversibility and cleaning without chemical reagents, Journal of Membrane Science, 348 (2010) 337-345.

[7] A. Achilli, T. Y. Cath, A. E. Childress, Selection of inorganic-based draw solutions for forward osmosis applications, Journal of Membrane Science, 364 (2010) 233-241.

[8] R. K. McGovern, J. H. Lienhard V, On the potential of forward osmosis to energetically outperform reverse osmosis desalination, Journal of Membrane Science, 469 (2014) 245-250.

[9] Q. Ge, J. Su, G. L. Amy, T. S. Chung, Exploration of polyelectrolytes as draw solutes in forward osmosis processes, Water Res, 46 (2012) 1318-1326.

[10] K. Lutchmiah, L. Lauber, K. Roest, D. J. H. Harmsen, J. W. Post, L. C. Rietveld, J. B. van Lier, E. R. Cornelissen, Zwitterions as alternative draw solutions in forward osmosis for application in wastewater reclamation, Journal of Membrane Science, 460 (2014) 82-90.

[11] C. X. Guo, D. Zhao, Q. Zhao, P. Wang, X. Lu, Na(+)-functionalized carbon quantum dots: a new draw solute in forward osmosis for seawater desalination, Chemical Communications, 50 (2014) 7318-7321.

[12] M. L. Stone, A. D. Wilson, M. K. Harrup, F. F. Stewart, An initial study of hexavalent phosphazene salts as draw solutes in forward osmosis, Desalination, 312 (2013) 130-136.

[13] Q. Ge, T. S. Chung, Hydroacid complexes: a new class of draw solutes to promote forward osmosis (FO) processes, Chemical Communications, 49 (2013) 8471-8473.

[14] H. Bai, Z. Liu, D. D. Sun, Highly water soluble and recovered dextran coated Fe3O4 magnetic nanoparticles for brackish water desalination, Separation and Purification Technology, 81 (2011) 392-399.

[15] R. Alnaizy, A. Aidan, M. Qasim, Draw solute recovery by metathesis precipitation in forward osmosis desalination, Desalination and Water Treatment, 51 (2013) 5516-5525.

[16] Y. C. Kim, S. Han, S. Hong, A feasibility study of magnetic separation of magnetic nanoparticle for forward osmosis, Water Science & Technology, 64 (2011) 469.

[17] M. Noh, Y. Mok, S. Lee, H. Kim, S. H. Lee, G. W. Jin, J. H. Seo, H. Koo, T. H. Park, Y. Lee, Novel lower critical solution temperature phase transition materials effectively control osmosis by mild temperature changes, Chemical Communications, 48 (2012) 3845-3847.

[18] Y. Mok, D. Nakayama, M. Noh, S. Jang, T. Kim, Y. Lee, Circulatory osmotic desalination driven by a mild temperature gradient based on lower critical solution temperature (LCST) phase transition materials, Phys Chem Chem Phys, 15 (2013) 19510-19517.

[19] Y. Cai, W. shen, J. Wei, T. H. Chong, R. Wang, W. B. Krantz, A. G. Fane, X. Hu, Energy-efficient desalination by forward osmosis using responsive ionic liquid draw solutes, Environmental Science: Water Research & Technology, In press (2015).

[20] M. L. Stone, C. Rae, F. F. Stewart, A. D. Wilson, Switchable polarity solvents as draw solutes for forward osmosis, Desalination, 312 (2013) 124-129.

[21] Y. Cai, W. Shen, R. Wang, W. B. Krantz, A. G. Fane, X. Hu, CO2 switchable dual responsive polymers as draw solutes for forward osmosis desalination, Chemical Communications, 49 (2013) 8377-8379.

[22] J. R. McCutcheon, R. L. McGinnis, M. Elimelech, A novel ammonia-carbon dioxide forward (direct) osmosis desalination process, Desalination, 174 (2005) 1-11.

[23] J. R. McCutcheon, R. L. McGinnis, M. Elimelech, Desalination by ammonia-carbon dioxide forward osmosis: Influence of draw and feed solution concentrations on process performance, Journal of Membrane Science, 278 (2006) 114-123.

[24] R. L. McGinnis, M. Elimelech, Energy requirements of ammonia-carbon dioxide forward osmosis desalination, Desalination, 207 (2007) 370-382.

[25] D. L. Shaffer, J. R. Werber, H. Jaramillo, S. Lin, M. Elimelech, Forward osmosis: Where are we now?, Desalination, (2014).

[26] A. Apelblat, E. Manzurola, Solubilities of L-aspartic, DL-aspartic, DL-glutamic, p-hydroxybenzoic, o-anisic, p-anisic, and itaconic acids in water from T=278 K to T=345 K, The Journal of Chemical Thermodynamics, 29 (1997) 1527-1533.

[27] S. H. Yalkowshy, Y. He, P. Jain, Handbook of Aqueous Solubility Data, Second Edition, CRC Press, 2010.

[28] W. M. Haynes, CRC Handbook of Chemistry and Physics, 95th Edition, 2014.

[29] N. Kubantseva, R. W. Hartel, Solubility of Calcium Lactate in Aqueous Solution, Food Reviews International, 18 (2002) 135-149.

[30] H. Luo, Q. Wang, T. C. Zhang, T. Tao, A. Zhou, L. Chen, X. Bie, A review on the recovery methods of draw solutes in forward osmosis, Journal of Water Process Engineering, 4 (2014) 212-223.

[31] B. D. Coday, D. M. Heil, P. Xu, T. Y. Cath, Effects of transmembrane hydraulic pressure on performance of forward osmosis membranes, Environ Sci Technol, 47 (2013) 2386-2393.

[32] R. L. McGinnis, Osmotic desalination process, in, U.S. Pat. No. 6,391,205 B1, 2002.

[33] A. Panson, G. Economy, C. t. Liu, T. Bulischeck, W. Lindsay, Sodium Phosphate Solubility and Phase Relations Basis for Invariant Point Chemistry Control, Journal of The Electrochemical Society, 122 (1975) 915-918.

[34] B. D. Coday, P. Xu, E. G. Beaudry, J. Herron, K. Lampi, N. T. Hancock, T. Y. Cath, The sweet spot of forward osmosis: Treatment of produced water, drilling wastewater, and other complex and difficult liquid streams, Desalination, 333 (2014) 23-35.

[35] X. Lu, C. Boo, J. Ma, M. Elimelech, Bidirectional diffusion of ammonium and sodium cations in forward osmosis: role of membrane active layer surface chemistry and charge, Environ Sci Technol, 48 (2014) 14369-14376.

[36] D. K. Brenner, E. W. Anderson, S. Lynn, J. M. Prausnitz, Liquid-liquid equilibria for saturated aqueous solutions of sodium sulfate+1-propanol, 2-propanol, or 2-methylpropan-2-ol, Journal of Chemical and Engineering Data, 37 (1992) 419-422.

[37] S. Lynn, A. L. Schiozer, W. L. Jaecksch, R. Cos, J. M. Prausnitz, Recovery of anhydrous Na2SO4 from SO2-scrubbing liquor by extractive crystallization: Liquid-liquid equilibria for aqueous solutions of sodium carbonate, sulfate, and/or sulfite plus acetone, 2-propanol, or tert-butyl alcohol, Industrial & engineering chemistry research, 35 (1996) 4236-4245.

[38] A. M. Ting, S. Lynn, J. M. Prausnitz, Liquid-liquid equilibria for aqueous systems containing N, N-diethylmethylamine and sodium chloride or sodium sulfate, Journal of Chemical and Engineering Data, 37 (1992) 252-259.

The invention claimed is:

1. A method of forward osmosis comprising:
   (a) introducing a first solution having a first temperature on a first side of a semi-permeable membrane and a concentrated draw solution comprising an inorganic salt having a second temperature on a second side of the semi-permeable membrane;
   (b) promoting flow of at least a portion of the first solution across the semi-permeable membrane to form a second solution on the first side of the semi-permeable membrane and a dilute draw solution on the second side of the semi-permeable membrane;
   (c) introducing at least a portion of the dilute draw solution to a first separation operation at a third temperature to recover a hydrate of the inorganic salt and a solution stream;
   (d) heating the hydrate of the inorganic salt to a fourth temperature to regenerate the concentrated draw solution; and
   (e) reintroducing the concentrated draw solution to the second side of the semi-permeable membrane,
   wherein:
   the inorganic salt is selected from one or more of the group selected from sodium sulfate, calcium lactate, disodium phosphate, tetrasodium pyrophosphate, and hydrates thereof;
   the first temperature and the second temperature are greater than the third temperature;
   when the solution stream comprises the inorganic salt, the solution stream is subjected to a further separation operation to provide a solvent stream and a hydrate of the inorganic salt; and
   the further separation operation is an organic solvent-assisted extractive crystallisation to provide the hydrate of the inorganic salt and solvent mixture that is yet further separated to provide an organic solvent and the solvent stream.

2. The method of claim 1, wherein the inorganic salt is disodium phosphate or hydrates thereof.

3. The method of claim 2, wherein the wherein the inorganic salt is disodium phosphate dodecahydrate.

4. The method of claim 1, wherein the inorganic salt is provided in the draw solution at a concentration of from 10 wt % to 50 wt %.

5. The method of claim 4, wherein the inorganic salt is provided in the draw solution at a concentration of 40 wt %.

6. The method of claim 1, wherein:
   the first and second temperatures are independently from 32° C. to 55° C.; and
   the third temperature is from 0° C. to 30° C.

7. The method claim 1, wherein the fourth temperature is from 40° C. to 55° C.

8. The method of claim 1, wherein the organic solvent is added to the solution stream at a weight % ratio of from 20 wt % to 150 wt % relative to the solvent stream.

9. The method of claim 1, wherein the organic solvent is selected from one or more of the group consisting of a ketone, an ester, an ether or an alcohol.

10. The method of claim 9, wherein the organic solvent is acetone.

11. The method of claim 1, wherein the first solution is seawater, brackish water, brine, a municipal wastewater, a wastewater from the oil and gas industry or a wastewater from the mining industry.

* * * * *